Dec. 6, 1927.
L. G. DANIELS
1,651,949
AUTOMATIC MACHINE TOOL
Filed Feb. 16, 1923   3 Sheets-Sheet 3
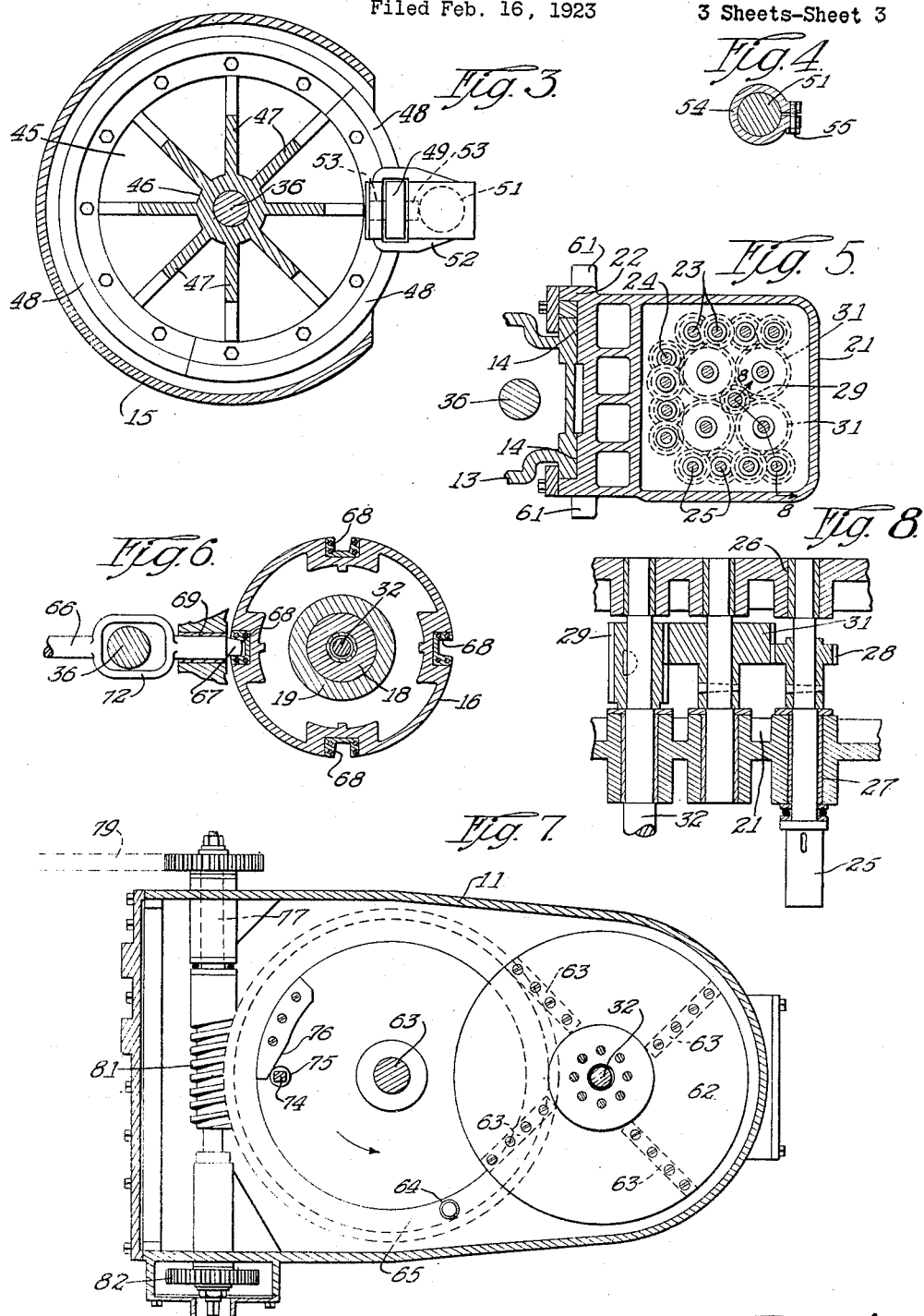

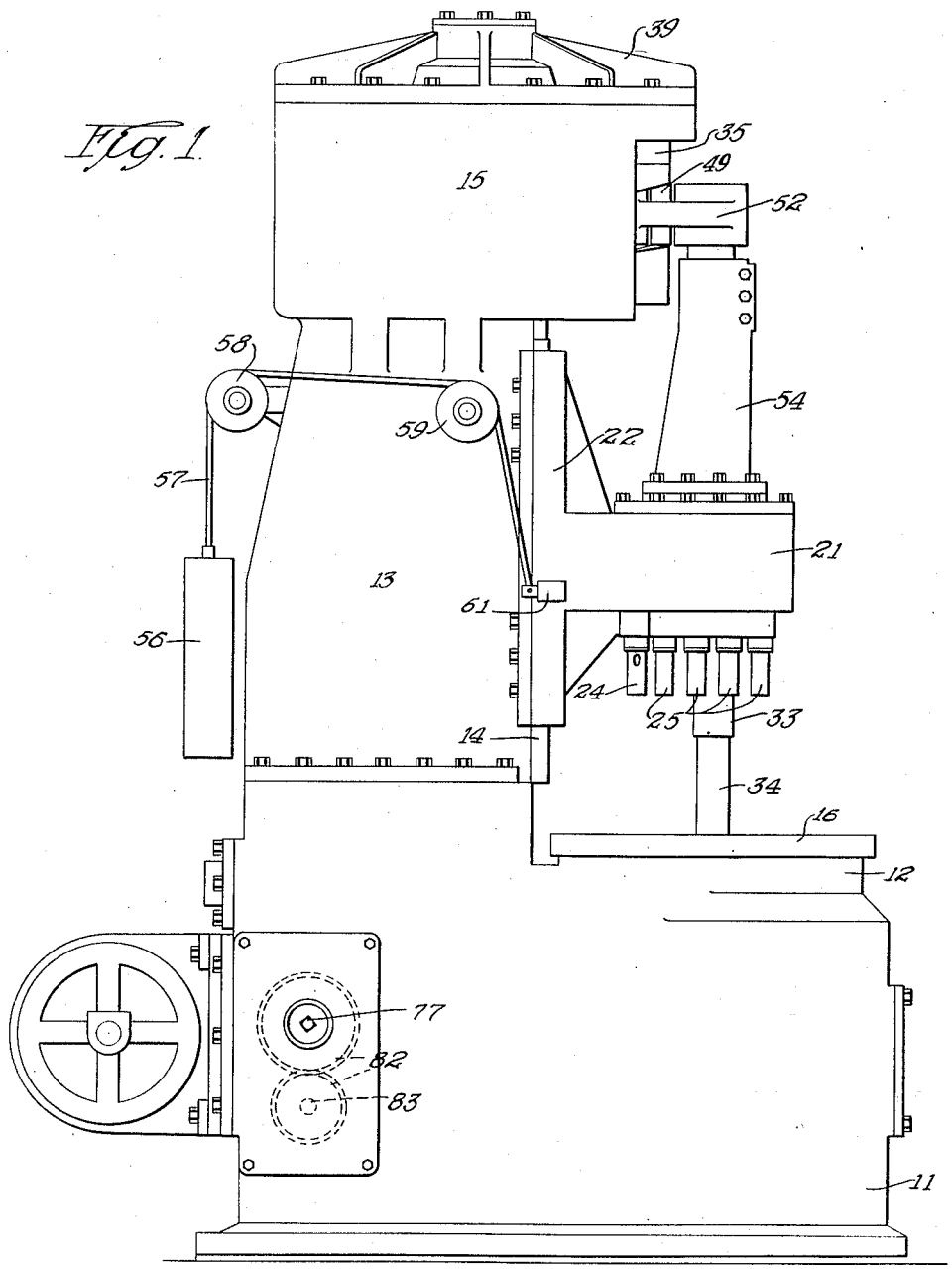

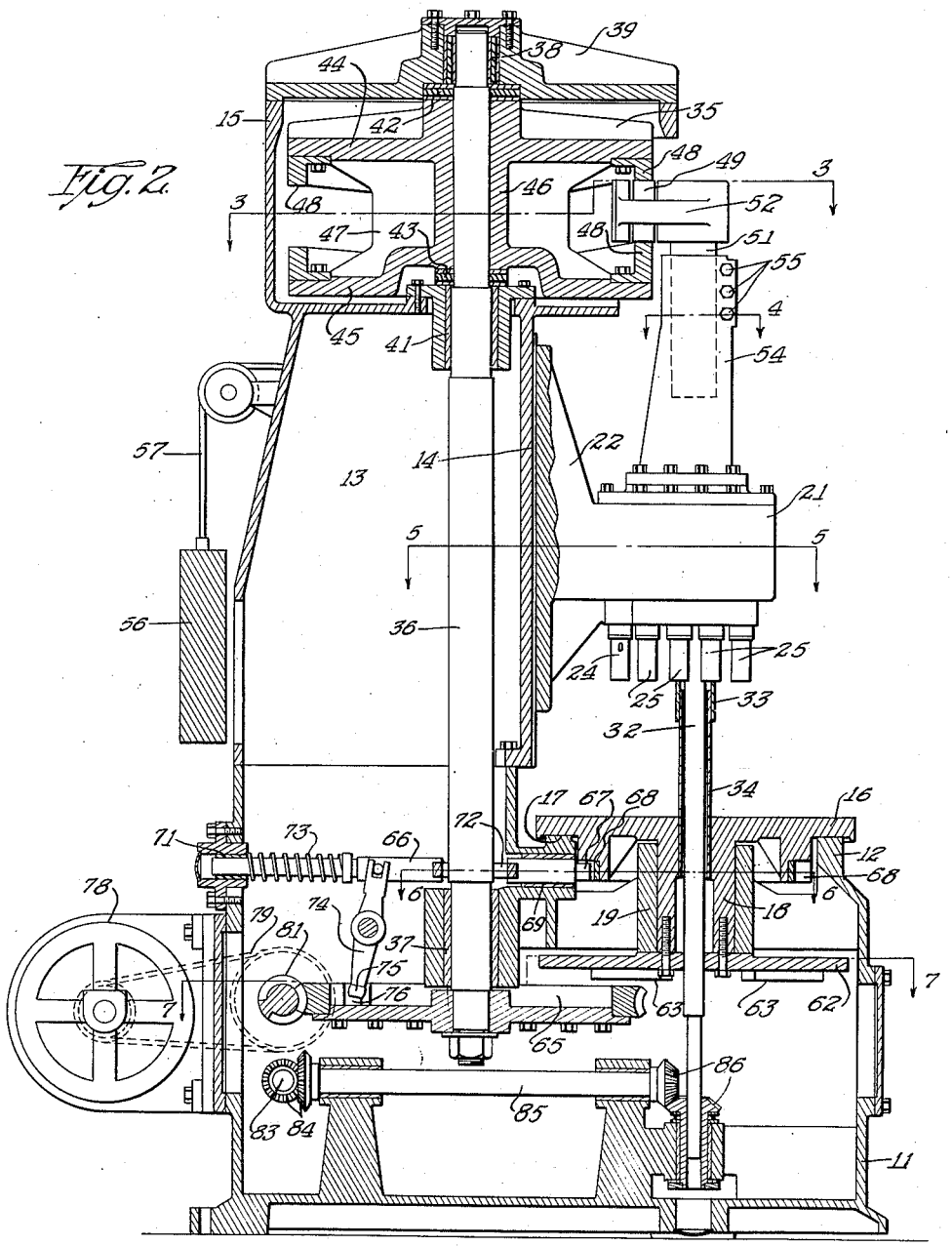

Patented Dec. 6, 1927.

1,651,949

UNITED STATES PATENT OFFICE.

LEE G. DANIELS, OF ROCKFORD, ILLINOIS.

AUTOMATIC MACHINE TOOL.

Application filed February 16, 1923. Serial No. 619,345.

This invention relates to automatic machine tools in which a series of cutting operations are successively performed on one or more work-pieces, and has more particular reference to machines in which the work-pieces are carried from station to station by indexing of the work carrier and in which a multiple spindle tool carrier is moved into and out of operation for simultaneously operating on the work-pieces at the several stations, thereby performing a series of operations on each work-piece. My invention is, moreover, an improvement on the automatic machine tool disclosed in my copending application Serial No. 553,761, filed April 17, 1922; and while being especially adapted for vertical machines of this type, is applicable also in certain respects to horizontal machines.

The primary object of the present invention is to provide a simplified and generally improved automatic machine tool of the character described.

Another object is to provide a special-purpose machine of said character, comprising but few parts arranged in such novel manner as to enable production of the machine at a comparatively low cost.

Still another object is to provide an automatic machine tool characterized by its novel organization of parts, especially with relation to the mounting and operation of the work and tool carriers. In this regard, I have aimed to so mount the tool carrier that in operation, its tools will not be subjected to the usual vibratory strains set up by reason of the heavy feed pressures, with the result that greater accuracy and uniformity in the production of parts is obtained. I have also aimed to provide an improved cam-operated means for moving the tool carrier in its approach, feed and reverse movements, in which the cams and parts requiring attention for setting and adjustment are readily accessible.

My invention also contemplates the provision of a multiple spindle machine characterized by a base supporting a horizontal index work table and having an upright column at one side of the table, a multiple spindle tool carrier vertically slidable on ways on said column and equipped with spindles driven by a shaft extending coaxially through the table, and a rotary cam drum positioned on top of said column and overreaching the tool carrier for moving it on said ways by direct pressure in the plane of its travel.

Other objects are to provide an improved frame structure for the support of said parts comprising a base, upright column and cam housing; to provide an improved cam-operated means for moving the multiple spindle tool carrier, in which a simple adjustment may be made for setting and wear of the tools; to provide an improved tool carrier; to provide an improved table indexing mechanism and means for locking the table in indexed position; and to arrange said parts in such novel manner as to enable the use of simplified drive means.

Other objects and attendant advantages will be appreciated by those skilled in this art as the invention becomes better understood by reference to the following description when considered in connection with the accompanying drawings,—

Figure 1 is a side elevation of a multiple spindle machine embodying my invention;

Fig. 2 is a vertical sectional view through the machine with the tool-carrier in elevation;

Figs. 3, 4, 5, 6 and 7 are horizontal plan sections taken substantially on the lines 3—3, 4—4, 5—5, 6—6 and 7—7, respectively, of Fig. 2; and Fig. 8 is a fragmentary vertical section taken substantially on the line 8—8 of Fig. 5.

In the preferred form of my invention the frame is composed of a base 11 having a horizontal table-supporting part 12, an upright column 13 rigid on the base at one side of the table-supporting part 12 and having wide faced vertical ways 14 on its face for slidably supporting a tool carrier, and a cam drum housing 15 on top of the column in which is mounted a rotary cam drum for moving the tool carrier vertically on said face, said reference numerals being generally applied. In the present case, the column 13 and housing 15 are in one casting which is bolted to the base, as shown plainly on Fig. 1. This frame provides a very rigid and substantial supporting structure for the several operating parts and is an important factor in promoting accuracy and precision in the machining of parts by the tools.

The horizontal work table or carrier designated generally by 16, is supported on ways 17 on the base part 12, and has a depending hub 18 revoluble in a fixed bearing 19 in the base. This table is adapted to carry work fixtures or jigs at circumferentially spaced points corresponding in number to the different stations, such for example as a loading station, and a series of tool operating stations to which the work fixtures are successively moved by indexing of the table. In the present instance, the loading and unloading station is at the front of the machine, that is, at the right hand end viewing Figs. 1 and 2, and there are three operating stations at 90 degrees apart, as will be more fully explained hereinafter with reference to the tool spindles. The work table will, therefore, be moved 90 degrees each time it is indexed and three operations will be successively performed on each work-piece. This number of stations and likewise the spindle arrangement which will be later described, may of course, be varied in different machines to suit the requirements of the particular work at hand. My present invention is particularly intended for application to so-called special-purpose machines in each of which the movement and arrangement of the spindles and the mounting of the work-pieces on the table are especially suited to the particular job. The means for indexing the work table and for locking it in each indexed position will be described later.

The size and shape of the tool carrier will, in view of the foregoing remarks, vary in accordance with the number and arrangement of spindles, but will invariably comprise a spindle housing 21, and an elongated slide 22 reaching above and below the side housing. The slide 22 has a relatively long and wide bearing on the ways 14 so that a very rigid and substantial support for the spindle housing is provided. In this regard it will be noted that the present invention permits the use of a column 13 having four substantially imperforate upright walls giving a very rigid supporting structure. The tool-carrier retained on the ways by the usual gibs, is adapted to slide vertically on such ways, the limit of travel in the present instance being comparatively small by reason of the particular work for which this machine is intended.

As shown on Fig. 5, the tool carrier is equipped with three groups of tool spindles 23, 24 and 25, each comprising four spindles in a common plane, and the spindles of each two adjoining group being 90 degrees apart. These spindles may be of any suitable or preferred construction, and at present are each journaled in upper and lower bearings 26 and 27, respectively, in the spindle housing, and are equipped intermediate said bearings with a spur gear 28 driven through an intermediate gear from a central driving gear 29. In this arrangement the spindles are divided into pairs and the gears 28 on the spindles of each pair are positioned in different vertical planes so that both may mesh with an intermediate gear 31. The diametrically opposed intermediate gears 31 are in turn arranged in different vertical planes so as to mesh with the elongated central driving gear 29. In this way, all of the tool spindles will be simultaneously driven by the central gear 29, which in turn is fixed to a drive shaft 32 reaching downwardly and passing through the center of the work table 16 into the base, where it is driven by means which will be described later. A sleeve 33 around the shaft 32 and fixed to the spindle housing telescopes over a sleeve 34 fixed to the work table, thereby preventing chips and other foreign matter from reaching the spindle drive shaft 32.

A rotary cam drum designated generally by 35, is employed for moving the tool carrier vertically on its ways in approach, feed and reverse movements. One of the features of the present invention is the novel location of this cam drum on top of the upright column on a vertical axis in proximity to the face 14 so that the cams overreach the tool carrier. As a result of this location, the cam drum is readily accessible for inspection, replacement and setting of cam plates, and substitution of one cam drum for another, if occasion requires. Furthermore, it also permits of a more direct and efficient application of power for moving the tool carrier. Another important advantage is that it enables a material reduction of driving parts and such arrangement of these parts that the several driving trains are simple, practical and direct.

The cam drum 35 is fixed to the upper end of a vertical cam shaft 36 journaled at its lower end in a fixed bearing 37 on the base and at its upper end in a bearing 38 on the removable cover 39 of the housing 15, and intermediate its ends in an adjustable bearing 41 on top of the column 13. The cam shaft being fixed to the cam drum by any suitable means, is suspended from the latter, and the cam drum is in turn supported upon and between end thrust bearings 42 and 43. The cam drum is preferably in the form of a heavy casting composed of annular cam-carrying parts 44 and 45 joined by a hub 46 and radial webs 47. To each of the parts 44 and 45 are bolted segmental cams 48, which define an annular cam way and are shaped to move the tool carrier in the above mentioned approach, feed and reverse movements. When variations in the tool carrier travel are required for different jobs, the cam plates will be changed and in some instances it will be found more convenient to substitute an entirely new cam drum. The cam roller or follower 49 is carried on a feed bar 51 through the agency of a bracket 52. In order to insure a rigid and stable mounting for the roller and to maintain its face in proper relation to the cam faces under the severe working conditions and heavy feed pressures, I have provided the roller with trunnions 53 mounted in suitable bearings carried by the bracket 52. The foregoing cam and roller construction per se constitutes the subject matter of my copending application, Serial No. 460,045, filed April 9, 1921. The feed bar between the cam roller 49 and the tool carrier is preferably composed of two parts, namely the bar 51 above mentioned, and an upstanding rigid arm or extension 54 on the tool carrier. The part 51 clamped in the part 54 by bolts 55, is axially adjustable in the latter part for the purpose of changing the position of the tool carrier with respect to the cam surfaces whenever occasion requires, as for example when setting the tools, especially after they have become worn.

It will be observed that the feed bar structure, the tool carrier, the work table and the spindle-driving shaft 31, are in axial alignment, this being a very efficient organization for the reason that the lines of forces are centralized and directly applied in their application to the work to be performed.

The tool carrier is counterbalanced by a weight 56 disposed at the rear of the column 13 and connected to said carrier by chains 57 trained over pulleys 58 and 59 at each side of the column. Said chains are attached to lugs 61 on the sides of the tool-carrier slide 22, so as to equalize the counterbalancing effect on the slide.

The indexing mechanism includes a simplified form of Geneva movement and comprises a plate 62 fixed to the lower end of the work table hub 18, quarteringly disposed abutment bars 63 fixed to the underside of said plate 62 in slightly tangential relation and an upstanding roller 64 carried on top of a worm gear 65 fixed to the lower end of the cam shaft 36. These parts are so relatively arranged as shown on Fig. 7, that upon each revolution of the worm gear 65, the roller 64 will engage one of the abutment bars 63 and thereby move the work table 90 degrees. While the roller 64 travels at a uniform speed, the indexing movement of the table will be variable, accelerating from the start and then slackening until the table comes practically to a stand at the finish.

The work table will be locked after each indexing, and for this purpose I employ a locking bar 66 having a nose 67 adapted to enter any of the recesses 68 in the periphery of the reduced portion of the work table. The locking bar 66, slidable in bearings 69 and 71, has a yoke 72 embracing the cam shaft 36 for allowing this bar to be positioned in radial relation to the work table and in alignment with the center of one of the stations, and likewise with the fore-and-aft centerline of the machine. A compression spring 74 on the locking bar urges it against the periphery of the work table and enters the nose of the bar into the recess brought into registration with the bar by indexing of the table. The locking bar will be withdrawn by means of a lever 74 carrying a roller 75 adapted to be actuated by a cam 76 on the worm gear 65. Viewing Fig. 7, it will be manifest, assuming the worm gear 65 is revolved in a counter-clockwise direction, that the locking bar will be withdrawn by the action of the cam 76 just prior to the commencement of the indexing operation, and that when the work table has been indexed the locking bar will enter the next succeeding recess 68 and securely lock the table against displacement.

The spindle drive shaft 32 and cam shaft 36 may be driven by any suitable means. In the present instance, I employ a simple driving train comprising a transverse drive shaft 77 adapted to be driven from any source, such for example as an electric motor 78 through the agency of a chain 79, a worm 81 fixed to the shaft 77 and in mesh with the worm gear 65, transposing gears 82 connecting the shaft 77 to a lower shaft 83, bevel gears 84 connecting the shaft 83 to a shaft 85, and bevel gears 86 connecting said shaft 85 to the spindle drive shaft 32. The latter shaft is splined in its driving gear 86 to permit of vertical travel of said shaft with the tool carrier. From the foregoing, it will be seen that during operation the tool spindles and the cam shaft 36 will be continuously driven.

It will be observed that inasmuch as the table indexing mechanism and the tool carrier feed mechanism are operated and controlled by the cam shaft 36, they will be caused to function in predetermined relation and to continuously repeat their cycle of operations. As the machine is shown on the drawings, the tool carrier has been elevated to its highest position. The period during which it is elevated and the number of degrees on the cam for moving the tools in the approach, feed and reverse movements are not essential to the present invention. It will, therefore, suffice to say that while the tools are being withdrawn and are held elevated, the table will be indexed in the manner explained above, the indexing operation consuming in the present case about 90 degrees of the cam and the balance being used for advancing and withdrawing the tools. It will be manifest that during this latter period the operator will unload and load the work fixture at the front of the machine. The four spindles at each tooling station may be used for simultaneously operating on a single work-piece or on four work-pieces, it being evident that this particular combination is merely illustrative of a special arrangement of multiple spindles, and consequently characterizes a special-purpose machine.

From the foregoing, it will be observed that considering the number of operations performed and the automatic character of the machine, the number of parts employed in the driving trains are very low in comparison with other machines designed for similar purposes, that by reason of the compact arrangement of parts the machine occupies comparatively small floor space, that the cam drum and motion train between it and the tool carrier is direct, conveniently accessible and adjustable, and that the parts are so organized as to function efficiently and without detrimental vibration, to the end that accurate and uniform work may be performed, especially for high production.

It is believed that the foregoing conveys a clear understanding of the objects prefaced above, and while I have illustrated but a single working example, it should be understood that my invention may be embodied in various forms, within the scope of the appended claims, in which I claim:

1. In a machine of the character described, in combination, a base having a table-supporting part and an upright column at one side thereof, an indexing work table on said table-supporting part, a multiple spindle tool carrier over the table vertically slidable on said column, a continuously driven shaft extending from the base upwardly through said column, a cam drum on the upper end of said shaft connected for reciprocating the tool carrier vertically, and mechanism operated by said shaft for indexing the table.

2. A machine of the character described comprising, in combination, an indexing work table on a vertical axis, a multiple spindle tool carrier vertically reciprocable above the table, a continuously driven vertical shaft extending above and below the tool carrier, a cam drum on the upper end of said shaft connected for reciprocating the tool carrier, and mechanism operated from the lower end of the shaft for indexing the work table.

3. A machine of the character described comprising, in combination, an indexing work table on a vertical axis, a multiple spindle tool carrier vertically reciprocable thereabove, and a continuously driven vertical shaft equipped at its upper end with a cam drum connected for reciprocating the tool carrier and at its lower end with mechanism connected for indexing the work table.

4. In a vertical multiple spindle machine, the combination of a base, a horizontal indexing work table thereon, an upright column on the base, a multiple spindle tool carrier over the work table slidable vertically on said column, a rotary cam on the upper end of said column overhanging the tool carrier for moving it vertically, and a spindle-driving shaft passed through the center of the work table and driven from within the base.

5. In a vertical multiple spindle machine, the combination of a frame having a base and an upstanding column, a horizontal indexing work table on the base, a multiple spindle tool carrier above the work carrier vertically slidable on said column, a rotary cam above the tool carrier, means operable by said cam for moving the tool carrier vertically, a spindle-driving shaft passing coaxially through the work carrier, and drive mechanism within the frame for driving said cam and spindle-driving shaft.

6. In a multiple spindle machine, the combination of an indexing work carrier and a rotary cam on parallel axes laterally spaced, said work carrier and cam being longitudinally spaced apart and in overlapping relation, tool carrier slide ways interposed between said work carrier and cam and parallel with said axes, a multiple spindle tool carrier slidably supported on said ways in coaxial relation to the work carrier, a rigid extension coaxial with said tool carrier reaching toward the cam and equipped with a roller adapted to be operated by said cam for moving the tool carrier on said ways toward and from the work-carrier, and a spindle driving shaft in axial alignment with said extension and extending through the center of the work-carrier and being driven beyond the latter.

7. In a multiple spindle machine, the combination of a frame, an indexing work carrier thereon, a multiple spindle tool carrier coaxial with the work carrier and slidable axially on ways on said frame, a cam shaft parallel with the tool and work carrier axis and disposed in proximity to said ways, a rotary cam on said shaft beyond the end of the ways remote from the work table and overreaching the tool carrier for moving it on said ways, and indexing mechanism located beyond the end of said ways remote from said rotary cam and operated by the cam shaft for indexing the work carrier.

8. In a multiple spindle machine, the combination of a frame having work carrier supporting ways and tool carrier slideways in right angular relation, an indexing work carrier and a multiple spindle tool carrier on said ways respectively, the tool carrier comprising a spindle housing coaxial with the work carrier and an elongated slide reaching lengthwise of said ways substantially beyond the opposed ends of said housing, a spindle driving shaft passing through the center of the work table and driven beyond the latter, and a rotary cam at the opposite end of the tool carrier for sliding it on its ways.

9. In a multiple spindle machine of the character described, the combination of an indexing work carrier and a rotary cam drum on parallel laterally spaced axes with the carrier and drum longitudinally separated and in over-lapping relation, a multiple spindle tool carrier interposed between said work carrier and cam drum and movable toward and from the work carrier, a spindle driving shaft extending through the center of the work carrier and being driven beyond the latter, a cam roller, and a roller-carrying part fixed to the spindle carrier, whereby the latter may be moved toward and from the work carrier by the action of said cam drum, said multiple spindle carrier, spindle-driving shaft and roller-carrying part being in coaxial relation.

10. A multiple spindle machine as specified in claim 9, including telescoping sleeves embracing the spindle driving shaft between the work and tool carriers.

11. In a multiple spindle machine, the combination of an indexing work carrier and a slidable multiple spindle tool carrier in co-axial relation, a cam shaft parallel with the carrier axis, an index plate fixed to the work carrier, means on said cam shaft for actuating said index plate for indexing the work carrier, a spindle driving shaft passing through the center of the work carrier and said index plate and driven beyond the latter, and a rotary cam on said cam shaft for sliding the tool carrier with respect to the work carrier.

12. In a vertical multiple spindle machine, the combination of a base, a horizontal indexing work table thereon, an upstanding column on the base, a multiple spindle tool carrier vertically slidable on said column and coaxially disposed above said work table, a cam drum at the upper end of said column above and overreaching the tool carrier, and an upstanding arm coaxial with and rigid on said tool carrier and equipped at its upper end with a roller adapted to be operated by said cam drum for moving the tool carrier vertically.

13. In a vertical multiple spindle machine, the combination of a base, a horizontal indexing work table thereon, an upstanding column on the base, a multiple spindle tool carrier above the work table vertically slidable on said column, a rotary cam drum on a vertical axis at the upper end of said column above the tool carrier and having a circumferential cam substantially over-reaching said tool carrier, and an upstanding part carried by said tool carrier and equipped with a cam roller adapted to be operated by said cam for moving the tool carrier vertically.

14. In a multiple spindle machine, the combination of an indexing work carrier and a rotary cam on parallel axes laterally spaced, said work carrier and cam being longitudinally spaced apart and in overlapping relation, tool carrier slide ways interposed between said work carrier and cam and parallel with said axes, a multiple spindle tool carrier slidably supported on said ways in co-axial relation to the work carrier, a roller adapted to be operated by said rotary cam and connected to said tool carrier for moving it on said ways toward and from the work carrier, and a spindle driving shaft extending co-axially through the work carrier and driven at the side thereof remote from the tool carrier.

15. In a multiple spindle machine, the combination of a base having an upright column and a cam drum housing at the top thereof, an indexing work carrier mounted on the base at one side of said column, carrier slide ways on said column in a plane at right angles to the plane of rotation of said work table, a multiple spindle tool carrier having a spindle housing and a slide reaching longitudinally beyond both ends of said spindle housing and mounted to slide on said ways toward and from the work carrier, a rotary cam drum in said cam drum housing on an axis parallel with and in proximity to said ways and having a circumferential cam overreaching the tool carrier, and a cam roller carried by said spindle-carrying part and adapted to be operated by the cam drum for moving the spindle carrier on said ways.

16. In a vertical multiple spindle machine, the combination of a base, a horizontal indexing work table thereon, an upright column on the base having vertical ways on its side adjacent to the work table, a multiple spindle tool carrier vertically slidable on said ways, a cam drum at the upper end of said column above the tool carrier for rotation about a vertical axis in proximity to the carrier-supporting ways on said column and with the cam drum overreaching said tool carrier, and a cam follower adapted to be operated by said rotary cam and carried by the tool carrier for moving the latter vertically.

17. In a vertical multiple spindle machine of the character described, the combination of a base, an upright column thereon, a cam housing on top of said column, an indexing work table on the base, a multiple spindle tool carrier above the work table vertically slidable on said column, a rotary cam drum in said housing for moving the tool carrier vertically, a continuously driven vertical shaft in said column connected at its upper end to continuously rotate the cam drum, and indexing mechanism in the base operated by said vertical shaft for indexing the work table.

18. In a vertical multiple spindle machine, the combination of a base, a horizontal indexing work table thereon, an upright column on the base, a cam housing on top of said column, a multiple spindle tool carrier vertically slidable on said column over the work table, a rotary cam drum in said housing overreaching the tool carrier and connected with the latter for moving it vertically, a vertical drive shaft in said column coaxial with and connected to the cam drum for rotating it, and indexing mechanism in the base operated by said shaft for indexing the work table.

19. In a vertical multiple spindle machine of the character described, a frame comprising a base having a horizontal work table supporting part, an upright column having vertical ways for supporting a tool carrier above the work table, a cam housing on the upper end of said column overreaching said table-supporting part, an indexing work table on said base part, a multiple spindle tool carrier on said vertical ways, a rotary cam in said housing for moving the tool carrier vertically, a vertical drive shaft in said column connected at its upper end to said cam for rotating it, and indexing mechanism in the base operated by said drive shaft for indexing the work table.

20. In a vertical multiple spindle machine, the combination of a base having a horizontally spaced work table supporting part and a column supporting part, an indexing work table and an upright column on said supporting parts respectively, said column having vertical ways on its side nearest the work table, a multiple spindle tool carrier vertically slidable on said ways over the work table, a vertical cam shaft within the column in proximity to said ways, cam-operated means above the column driven by said cam shaft for moving the tool carrier on said ways, and indexing mechanism within the base driven by said cam shaft for indexing the work table.

21. In a vertical multiple spindle machine, the combination of a base, a horizontal indexing work table thereon, an upright column fixed on the base at one side of said work table, a cam housing on top of said column, a multiple spindle tool carrier vertically slidable on said column over the work table, a vertical cam shaft journaled at its lower and upper ends on fixed bearings in the base and cam housing respectively and intermediate its ends on an adjustable bearing on said column, and a cam carried by said shaft in said housing for moving the tool carrier vertically.

22. In a vertical multiple spindle machine, the combination of a base having a horizontally spaced work table supporting part and a column supporting part, an indexing work table and an upright column on said supporting parts respectively, a multiple spindle tool carrier vertically slidable on said column over the work table, a vertical cam shaft journaled on a lower bearing in the base and on an upper bearing on said column, a rotary cam on said shaft above the upper bearing for moving the tool carrier vertically, and means operated by the lower portion of said shaft for indexing the work table.

23. In a vertical multiple spindle machine, the combination of a base supporting an upstanding column, a horizontal indexing work table on the base, a multiple spindle tool carrier vertically slidable on said column, a vertical cam shaft in said column reaching above the tool carrier and below the work table, means for driving said shaft, means operated by the lower end of said shaft for indexing the work table, and a cam drum on the upper end of said shaft for moving the tool carrier vertically on said column.

24. A vertical multiple spindle machine comprising a base, an upstanding column supported thereby, a horizontal indexing work table on the base, a multiple spindle tool carrier vertically slidable on said column over the work table, a rotary cam on the upper end of said column, a cam follower operated by said cam for moving the tool carrier vertically, a spindle drive shaft passing through the center of the work table, means for indexing the work table, and drive mechanism for driving said rotary cam, spindle-drive shaft and indexing means in predetermined relation.

25. In a multiple spindle machine, the combination of an indexing work carrier and a multiple spindle tool carrier in coaxial relation, a cam shaft parallel with and laterally offset from said axis and reaching at opposite ends beyond the tool and work carriers, a cam on the end of the cam shaft beyond the tool carrier, a cam roller adapted to be operated by rotation of the cam drum and connected with the tool carrier for moving the latter toward and from the work carrier, mechanism for indexing the work carrier operated from the lower end of the cam shaft, a locking bar intermediate said cam drum and indexing mechanism for locking the work carrier in indexed position and operated by said cam shaft, and means for driving the cam shaft.

26. In a multiple spindle machine, the combination of an indexing work carrier and a multiple spindle tool carrier in coaxial relation, a cam shaft parallel with and laterally offset from said axis and reaching at opposite ends beyond the tool and work carriers, a cam on the end of the cam shaft beyond the tool carrier, a cam roller adapted to be operated by rotation of the cam drum and connected with the tool carrier for moving the latter toward and from the work carrier, a driving part on the end of the cam shaft beyond the work carrier, mechanism for indexing the work carrier including a part carried by said driving part for performing an indexing operation upon each revolution of the cam shaft, a locking bar for holding the work carrier in indexed position, and means operated by said driving part for withdrawing said locking bar.

27. In a machine of the character described, in combination, a base having a horizontal table-supporting part and an upright column at one side thereof and having vertical ways, a multiple spindle tool carrier reciprocable vertically on said ways, a work table on said table-supporting part, a vertical continuously driven shaft in said column equipped at its upper end with a cam drum connected for reciprocating the tool carrier, and indexing mechanism in the base operated by said shaft for indexing the work table.

28. A machine as set forth in claim 27 including a table locking bar having a yoke embracing said shaft and operated beyond the latter by said indexing mechanism.

29. A machine as set forth in claim 27 including a table locking bar in a plane radial with respect to the table and intersecting said shaft, and means operated by rotation of said shaft for operating the locking bar in timed relation with indexing of the work table.

30. A machine as set forth in claim 27 in which the indexing mechanism includes a worm gear fixed to said shaft for rotating it, and means including a part on the worm gear for indexing the work table at each revolution of said worm gear.

31. A machine as set forth in claim 27 including a worm gear on said shaft for rotating it, table indexing mechanism operated by said worm gear, and a table locking bar operated by said worm gear.

32. A machine as set forth in claim 27 including a spindle driving shaft in the base extending upwardly centrally through the work table and connected to the spindles, and drive mechanism in the base for rotating the cam driving shaft and the spindle driving shaft.

33. In a machine of the charatcer described, in combination, a base having an upright column, a horizontal indexing work table on the base at one side of said column, a spindle carrier vertically slidable on the column above the table, a rotary cam drum at the upper end of the column for reciprocating the spindle carrier, a spindle driving shaft passing downwardly through the center of the work table into the base, and driving mechanism for rotating said cam drum and spindle driving shaft.

34. A machine as set forth in claim 33 in which said driving mechanism includes a vertical shaft in said column for rotating the cam drum and connected for indexing the work table.

35. A machine of the character described comprising, in combination, a base having a horizontal table supporting part and an upright column at one side thereof, an indexing work table on the table supporting part, a tool carrier vertically slidable on said column above the table, a vertical shaft in said column having means at the upper end thereof providing a connection with the tool carrier for reciprocating the same in relation to the work table, means at the lower end of said shaft for indexing said table in timed relation to the reciprocation of the tool carrier, and means operated in timed relation to the indexing of the work table arranged to lock the same in its indexed positions, said means comprising a locking bar extending transversely relative to said shaft toward the table, spring means normally urging said bar to its engaged position, and means operated by the shaft for retracting said bar to release the table.

36. A machine of the character described comprising, in combination, a base having a horizontal table-supporting part and an upright column at one side thereof, an indexing work table on said table-supporting part, a multiple spindle tool carrier vertically slidable on said column above the table, a rotary cam drum at the upper end of said column connected for reciprocating the spindle carrier, a vertical shaft in said column for rotating the cam drum, and table indexing mechanism in the base including a worm gear on said vertical shaft.

37. A machine as set forth in claim 36 including a transverse drive shaft journaled in the base having a worm in mesh with said worm gear, and a driving train operated from said transverse drive shaft including a spindle driving shaft extending upwardly through the center of the work table and connected to the spindles.

38. A machine as set forth in claim 36 including a prime driving shaft in the base, a driving connection between said driving shaft and the vertical cam drum driving shaft, and a driving connection between said prime shaft and the spindles including a vertical spindle driving shaft extending upwardly through the center of the work table.

39. A machine of the character described comprising, in combination, a base having a horizontal table-supporting part and an upright column at one side thereof, an indexing work table on said table-supporting part, a multiple spindle tool carrier vertically slidable on the column above the table, an overhead cam drum for reciprocating the spindle carrier, and driving mechanism for rotating said cam drum and the spindles including a spindle driving shaft driven from within the base and extending upwardly through the center of the work table.

40. A machine as set forth in claim 39 in which said driving mechanism includes a vertical cam drum driving shaft driven from within the base.

41. In machine of the character described, in combination, a base having a horizontal table-supporting part and an upright column at one side thereof, an indexing work table on said table-supporting part, a multiple spindle tool carrier vertically slidable on said column above the table, an overhead cam drum, the tool carrier having a plurality of circumferentially spaced tool spindles, a feed bar structure attached to the top of the tool carrier and connected with the cam drum to be operated thereby, and a spindle driving shaft passing through the center of the work table and driven from within the base, the work table, tool carrier, feed bar structure and spindle driving shaft being in axial alignment.

42. A multiple spindle machine of the character described comprising, in combination, a frame supporting an indexing work table, the frame providing a column alongside the table, a multiple spindle tool carrier mounted on the column above the table for reciprocating up and down relative thereto, and a driven shaft extending up through the center of the work table and into the tool carrier for driving the tools thereof, the said shaft by reason of its central position in the table permitting indexing of the latter about the shaft as an axis.

43. A machine as set forth in claim 42 including means for reciprocating the tool carrier and indexing the work table in timed relation.

44. A machine as set forth in claim 42 including gears for driving the center shaft arranged to be changed for varying the speed thereof so as to vary the speed of the tools of the tool carrier.

45. In a machine of the character described, in combination, a base having a horizontal table-supporting part and an upright column at one side thereof and having vertical ways, a multiple spindle tool carrier reciprocable vertically on said ways, a work table on said table-supporting part, a vertical continuously driven shaft in said column equipped at its upper end with means for reciprocating the tool carrier, a worm gear on said shaft for turning the same, table indexing means operated by said worm gear, and a table locking bar also operated by said worm gear.

LEE G. DANIELS.